April 1, 1941.  W. B. FREEMAN  2,237,178
METHOD AND APPARATUS FOR MAKING BELTS
Filed Aug. 11, 1938  2 Sheets-Sheet 1
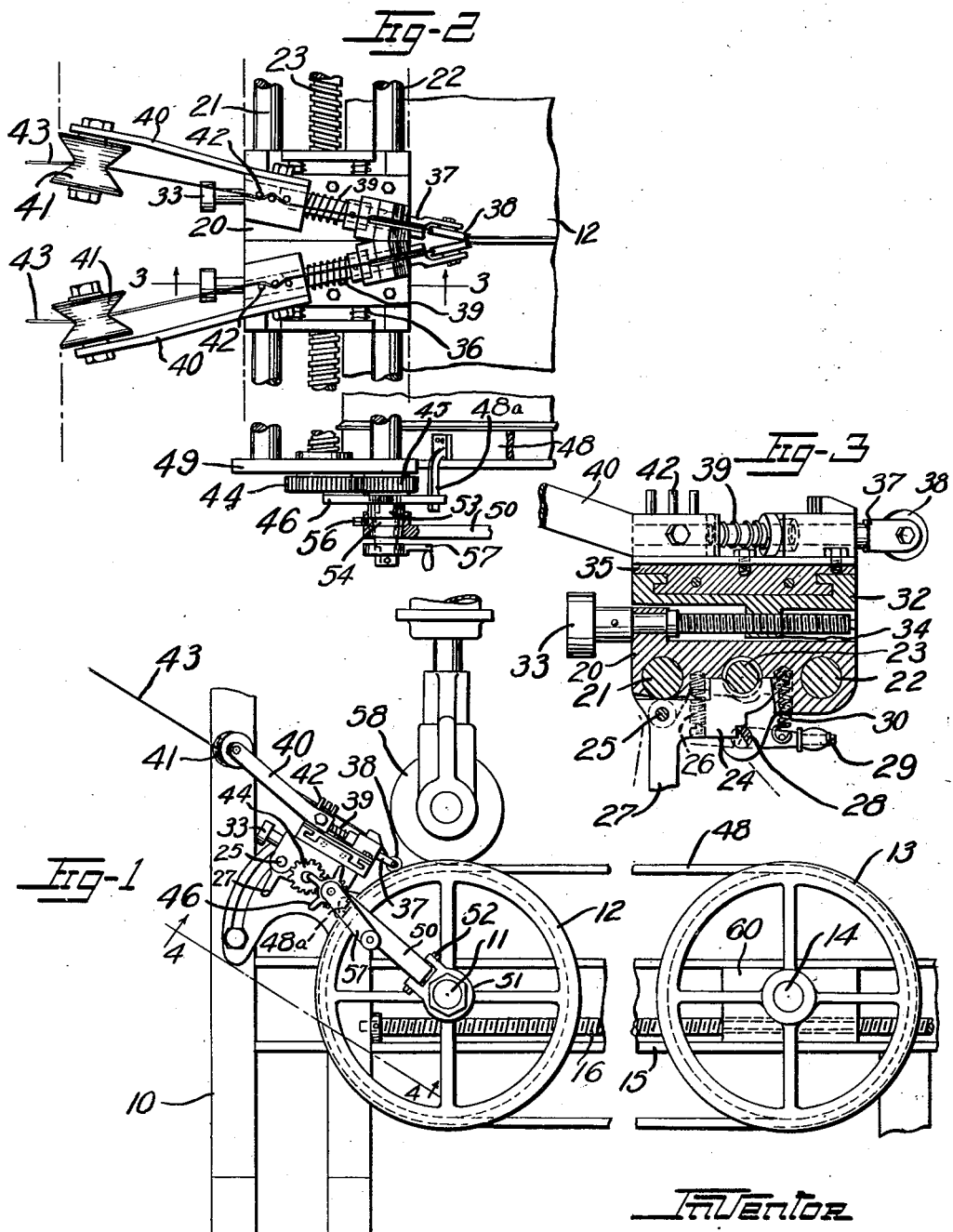
Inventor
Walter B. Freeman
By Willis T. Avery
Atty

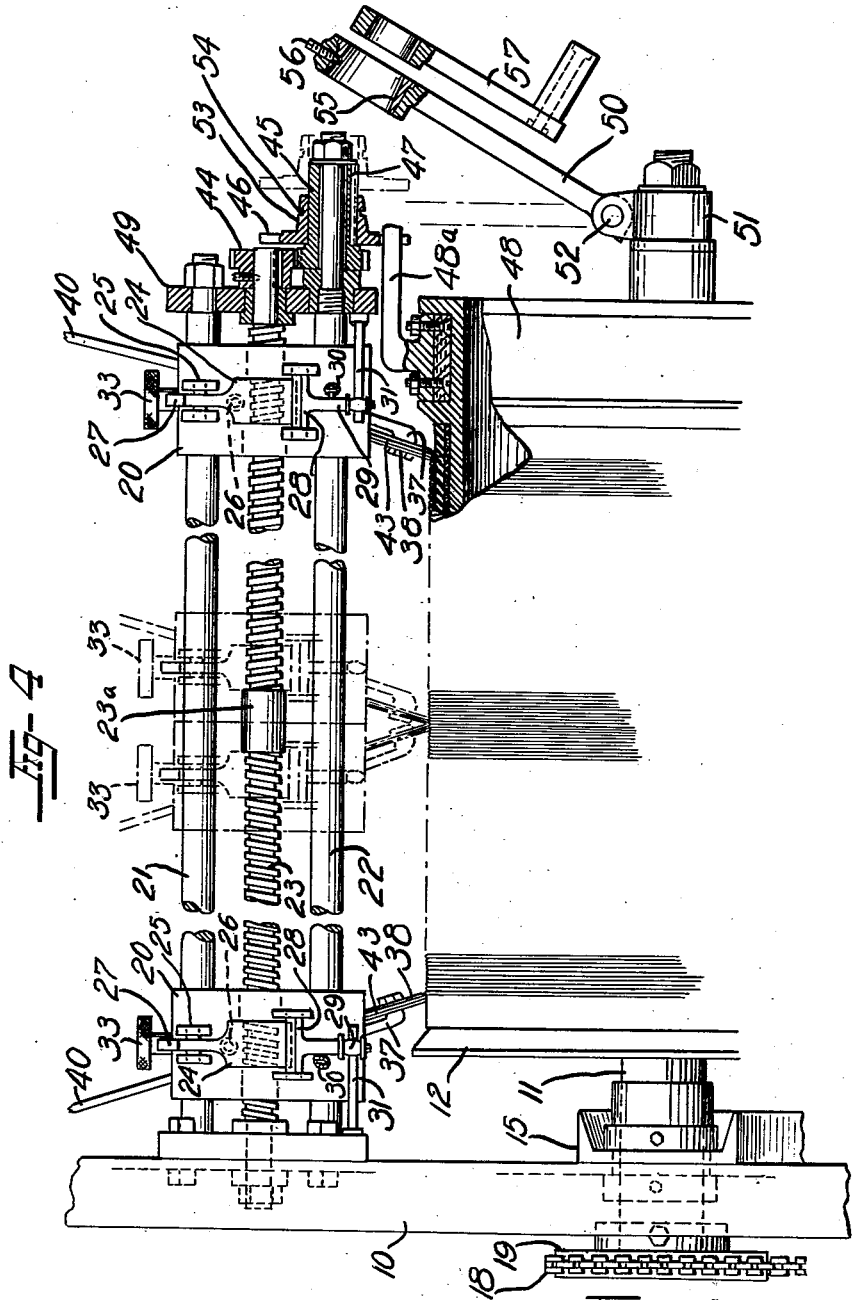

Patented Apr. 1, 1941

2,237,178

UNITED STATES PATENT OFFICE 2,237,178

METHOD AND APPARATUS FOR MAKING BELTS

Walter B. Freeman, Cuyahoga Falls, Ohio, assignor to The B. F. Goodrich Company, New York, N. Y., a corporation of New York Application August 11, 1938, Serial No. 224,419

7 Claims. (Cl. 154—4)

This invention relates to methods and apparatus for making belts and is especially useful where endless transmission belts of great circumferential length are to be produced.

In the manufacture of endless transmission belts either of flat or trapezoidal cross-section, rubberized longitudinally disposed filamentous strengthening elements, such as cords, are wound in a layer or layers upon a suitable former or support to provide the tension members of the belt. When the belt is of great circumferential length, it is convenient to wind the strengthening elements about a pair of spaced drums or formers which are adjustable with relation to each other to accommodate belts of different dimensions.

While it has been proposed to guide the cord so as to apply it in helical convolutions across the face of a drum by movement of a carriage across the face of the drum at a uniform velocity as related to the rotation of the drum, such a procedure has been found not to be wholly satisfactory where a pair of spaced drums are used as a support which must be adjusted from time to time to accommodate belts of different lengths, due to the difficulty of accurately setting the drums to the required dimension and changing of the length of the belt by shrinkage during manufacture and consequent impossibility of gearing the cord guide carriage with the belt with such exactitude as to avoid cumulative errors in disposition of the cord.

The present invention aims to overcome the difficulties experienced with prior apparatus.

The principal objects of the invention are to provide proper distribution of the cord, to provide distribution of two cords for initial convolutions in contact with each other to form opposed helices in the same layer, to provide proper distribution of a plurality of cords simultaneously on a single pair of drums, to compensate for inequalities of cord diameter, to distribute a plurality of cords under equal tension, and to simplify adjustment to belts of different dimensions.

These and other objects will appear from the following description and the accompanying drawings.

Of the drawings:

Fig. 1 is a side elevation of the apparatus of the invention in its preferred form, parts being broken away.

Fig. 2 is a detail plan view of the feeding mechanism, parts being broken away.

Fig. 3 is a cross sectional view taken on line 3—3 of Fig. 2, parts being broken away.

Fig. 4 is a detail view of the under side of the feeding mechanism, taken on line 4—4 of Fig. 1, parts being broken away.

Referring to the drawings, the numeral 10 designates a frame at one side of the machine in which a shaft 11 is journaled. A drum 12 is fixed to the shaft. A second drum 13 is fixed to a shaft 14 journaled in a carriage 60 (shown in Fig. 1) movable along rails 15 attached to the frame. The arrangement is such that the drums 12, 13 are rotatable on parallel axes and one is adjustable toward and from the other, the adjustment being accomplished by a feed screw 16 journaled in the frame and engaging a threaded part of the carriage. As the drums are supportable from one end only, belts may be placed upon the drum or removed therefrom with ease.

The drum 12 is driven from any convenient source of power (not shown) by means of a chain 18 engaging a pulley 19 fixed to shaft 11.

To provide for laying cord or other material in adjacent convolutions across the face of the drums, one or more carriages 20 are slidably mounted on a pair of rods 21, 22 fixed to the frame at one end and extending parallel to the face of the drums. A threaded feed screw 23 is journaled in the frame and is adapted to be engaged by a threaded half-nut 24 pivoted at 25 to the carriage. A coil spring 26 normally holds the half-nut out of engagement with the screw. A handle 27 permits manual movement of the half-nut into engagement with the screw. A latch 28 is pivoted on the carriage and has a portion of semi-circular cross section adapted to engage in one position under the half-nut and in another position to release the half-nut. It also has a lever 29 fixed thereto. A tension spring 30 holds the latch in the latched position. A cam 31 in the path of the carriage is adapted to engage the lever 29 and thereby to release the half-nut from the screw. The cam 31 may be located at a position to stop the feed of the carriage wherever desired to avoid jamming the carriage feed mechanism at the end of the feeding movement, or to limit laying of the cord to a certain part of the belt.

Each carriage 20 is formed with a guide way radial of the drum 12 and a tool rest 32 is slidably fitted therein. A feed screw 33 is journaled in the carriage and engages a threaded lug 34 of the tool rest. The arrangement is such that the tool rest may be advanced toward the drum.

The tool rest 32 is formed with a guide way, extending axially of the drum 12, in which a block 35 is slidably mounted for a limited movement. Coil springs 36 normally hold the block at one side of the carriage, but permit its movement along the guide way when the cord applied to the belt has been laid at a greater pitch than the feed of the carriage. A plunger arm 37 is slidably mounted on the block 35 for movement radially of the drum 12. A grooved cord guiding pulley 38 is rotatably mounted in a forked end of the plunger so as to engage the face of the drum 12. A coil spring 39 urges the plunger toward the drum 12. An arm 40 fixed to the block 35 carries a cord guiding pulley 41 and a set of tensioning pins 42. The cord 43 is received from a convenient supply source (not shown) and passes under the pulley 41, between the tension pins 42 and under the guide pulley 38 into contact with material on the drum 12. Where it is desired to lay two cords simultaneously from the center of the belt in opposite helices, the guide plungers 37 are disposed angularly in different directions on two carriages so as to bring the belt engaging portions of their guide wheels 38 as close together as possible and the screw shaft 23 is formed with threaded portions of opposite hand as shown in Fig. 2 to feed the carriages in opposite directions. To provide for centering the carriages at the beginning of the operation, a stop collar 23ᵃ may be fixed to the center of the feed screw in position to engage the margins of the half nuts and thereby to locate the grooved guide pulleys at the starting position.

The cord guide or guides are fed across the face of the drum 12 in such a manner as to lay the cord in successive convolutions in edge to edge contact with each other irrespective of the length of the belt. For this purpose a gear 44 is fixed to the end of the feed screw 23 and meshes with a gear 45 rotatably mounted on one end of the rod 22. Gear 45 has a long hub upon which a star wheel 46 is slidably mounted, a key or spline 47 being formed on the hub to engage a key-way in the star wheel and prevent relative rotation.

A belt 48 is mounted on the drums 12, 13 and an arm 48ᵃ fixed to the belt is adapted to rotate the star wheel one tooth each time the arm on the belt passes the star wheel irrespective of the length of the belt. As feed of the carriage takes place at one position only with respect to the belt there would be an offset in the lay of the cord at this position were it not for the independent lateral movement of the carriages made possible by the mounting of the carriages in the guide ways of tool rest 32. As the outboard ends of the guide rods 21, 22 are supported in spaced relation by a spacer block 49 otherwise unattached to the frame of the machine a removable brace 50 is provided to hold them in spaced relation to the drum shaft 11. For this purpose a collar 51 is rotatably mounted upon shaft 11 and brace 50 is hinged thereto, as at 52. The star wheel 46 is formed with a conical hub 53 in which a circumferential groove 54 is formed. The brace 50 has a conical seat 55 adapted to engage over the conical hub, and a screw 56 engages in the groove 54 to retain the arm in place. Due to the conical form of the hub, the brace 50 may be swung into and out of bracing position to permit removal of the finished belts or change of the belt 48.

To provide for hand movement of the carriages, a removable crank handle 57 is provided with a key-way to engage the key 47 on the hub 45. This crank may be used to turn the screw to adjust the carriages to starting position.

In the operation of the device, the feed operating belt 48 of the proper length is placed over the pulleys 12, 13, and the screw 16 is adjusted to give the proper tension to the belt. Sheet material to form the foundation of the belts to be constructed may be laid about the drums and rolled in place by a pressure roller 58 conveniently mounted above the drum 12. The screw 23 is then rotated to bring the carriages 20 to the starting position. The cords 43 are started onto the fabric layer under the guide pulleys 38. The drum 12 is rotated to drive the belt, and the cords 43 are laid in opposite helices by the movement of the carriages until the half nuts are released from the screw by the cams 31. Meanwhile the cords are pressed against the underlying layers by the roller 58. The belts may be completed in any desired manner and removed from the machine by loosening the tension on the belt 48.

As the carriages are fed the width of one cord at each complete travel of the belt, no adjustment of the feeding mechanism is necessary regardless of the length of the desired belt.

Various modifications may be made without departing from the invention as defined by the following claims.

I claim:

1. Apparatus for forming a layer of filamentous material, said apparatus comprising spaced-apart rotatable drums, a guide for directing the filament to the surface of one of the drums, means adapted to feed the guide across the face of the said drum, and means trained about the drums for actuating said feeding means.

2. Apparatus for forming a layer of filamentous material, said apparatus comprising spaced-apart rotatable drums, a plurality of guides for directing filaments to the surface of one of the drums, means adapted simultaneously to feed the guides across the face of the said drum, and means trained about said drums for intermittently actuating said feeding means.

3. Apparatus for feeding a layer of filamentous material, said apparatus comprising spaced-apart rotatable drums, a plurality of guides for directing filaments to the surface of one of the drums, means adapted to feed the guides across the face of the said drum in opposite directions, and means trained about said drums for intermittently actuating said feeding means.

4. Apparatus for forming a layer of filamentous material, said apparatus comprising spaced-apart rotatable drums, a guide for directing the filament to the surface of one of the drums, means adapted positively to feed the guide across the face of said drum, means trained about said drums for intermittently actuating the feeding means, and means for permitting independent movement of the guide under the influence of previously laid filament.

5. Apparatus for forming a layer of filamentous material, said apparatus comprising spaced-apart rotatable drums, a plurality of guides for directing filaments to the surface of one of the drums, means adapted simultaneously to feed the guides across the face of said drum, means trained about said drums for intermittently actuating said feeding means, and means for permitting independent movement of the guides under the influence of previously laid filament.

6. The method of forming a layer of filamentous material about spaced drums, which comprises positively guiding a filament to the surface of a supporting layer of material trained about the drums, effecting a single positive shift of the filament guide with respect to the supporting layer by intermittent contact of said supporting layer with means in its path controlling the filament guide at each cycle of travel of the supporting layer irrespective of the length of the supporting layer, and permitting independent movement of the guide under the influence of the previously laid filament between positive shifting movements to effect a helical disposition of the filament upon the supporting layer.

7. The method of forming a layer of filamentous material across the face of an endless support trained about spaced drums, which comprises positively guiding a pair of filaments to the surface of the support, effecting a single positive shift of the filament guides in opposite directions across the face of the support by intermittent contact of said support with means in its path controlling the filament guide at each cycle of the travel of the support irrespective of the length of the support, and permitting independent movement of the guides under the influence of the previously laid filaments between positive shifting movements to effect a helical disposition of the filaments in opposite directions upon the support.

WALTER B. FREEMAN.